Nov. 17, 1931.  H. F. SACKNUS ET AL  1,832,506
BEARING DIVIDING DEVICE
Filed Dec. 19, 1928

INVENTORS
Edward P. Kerrursh 2nd
BY Herbert F. Sacknus
Fay, Oberlin & Fay
ATTORNEYS.

Patented Nov. 17, 1931

1,832,506

UNITED STATES PATENT OFFICE

HERBERT F. SACKNUS, OF CLEVELAND, AND EDWARD P. KERRUISH, OF CLEVELAND HEIGHTS, OHIO, ASSIGNORS TO THE CLEVELAND GRAPHITE BRONZE COMPANY, OF CLEVELAND, OHIO, A CORPORATION OF OHIO

BEARING DIVIDING DEVICE

Application filed December 19, 1928. Serial No. 327,145.

The present invention, relating, as indicated, to a bearing is more particularly directed to semi-cylindrical bearings and to a method of forming the same with the elimination of a minimum of material from a closed cylindrical bearing.

To the accomplishment of the foregoing and related ends, said invention, then, consists of the means hereinafter fully described and particularly pointed out in the claim; the annexed drawings and the following drawings setting forth in detail certain means and one mode of carrying out the invention, such disclosed means and mode illustrating, however, but one of various ways in which the principle of the invention may be used.

In said annexed drawings:—

Figure 1:
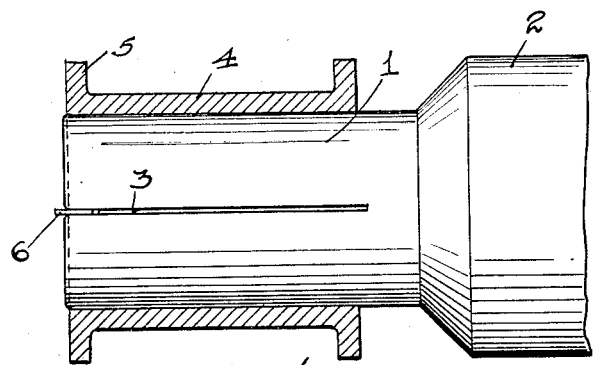
Figure 2:
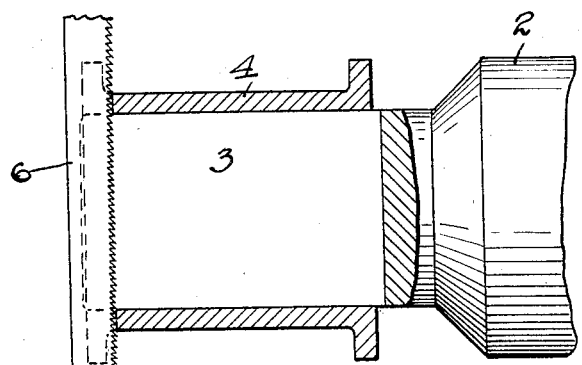
Figure 3:
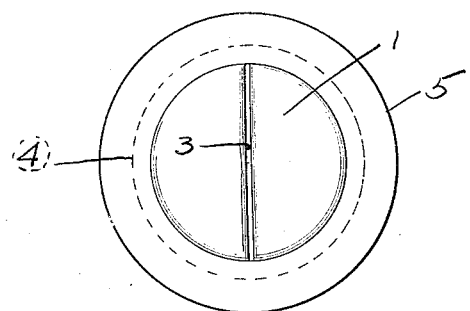

Fig. 1 is a horizontal sectional view of an apparatus adapted for carrying out the present method of producing semi-cylindrical bearings from closed cylinders; Fig. 2 is a central vertical section of the same; and Fig. 3 is an end elevation of the apparatus as shown in Fig. 2.

In the manufacture of lined bearings formed either from tubular stock or from flat stock first suitably formed into tubular shape, it is necessary to split the tubular element into two half bearings, and this operation is commonly performed by sawing apart the closed cylinders with rotary saws. In this operation it is impossible either when using the thinnest saws that can be obtained from the best steel, to avoid removing a very considerable amount of stock from the bearing, which makes it necessary to subject each of the two half bearings thereby formed to expensive and difficult reforming operations to again bring these half bearings to truly semi-cylindrical shape. The reforming is sometimes avoided by forming the original cylinder slightly over and then sawing it lengthwise across the short diameter. In this operation the stock which is removed by the sawing has been previously introduced into the cylinder at the point where it is to be removed and a minimum of reforming operations are thereby required.

The present invention is directed to an improved method and apparatus for splitting the cylindrical or nearly cylindrical shell into two approximately true semi-cylindrical bearing elements. Our improved method consists, briefly stated, in mounting the approximately cylindrical shell on a mandrel provided with a transverse guide slot therethrough, and then causing a thin band saw to operate within this slot to progressively cut the cylinder from end to end. In this way a band saw may be employed instead of a rotary saw and can be made of very much thinner material than the rotary saw so that a minimum of metal is removed from the closed cylinder and hence reforming operations may be reduced to a minimum.

Referring now to Fig. 1, there is shown a mandrel 1 mounted upon a suitable support 2 and provided with a central longitudinally extending slot 3. A tubular shell 4, which may be either of seamless tubing, or strip material formed into a cylinder, or of two semi-cylindrical strips suitably held or integrated together, and with or without flanges 5, is then slipped over the mandrel 1 which is adapted to fit snugly within the shell 4. A band saw 6 mounted in a suitable movable carriage (not shown) is then brought into the slot 3, as indicated in Fig. 1, and is caused to saw lengthwise of the shell 4 through the flanges, if any, and also through the barrel proper of the cylinder.

We have found that by this method of splitting the cylindrical shells an extremely small amount of material is removed and an amount which is materially less than that removed by rotary saws or by any other method of splitting now in use. It is possible by this method to remove so little material that a very slight amount of excess material has to be formed into the shell in the earlier operations, or if no excess material is provided in the shell then the reforming operations necessary to bring the half shells to a true semi-cylindrical condition are extremely simple and easy to carry out.

Other modes of applying the principle of our invention may be employed instead of the one explained, change being made as regards the means and the steps herein disclosed, provided those stated by the following claim or its equivalent be employed.

We therefore particularly point out and distinctly claim as our invention:—

In apparatus of the character described, the combination of a substantially cylindrical mandrel provided with a diametral longitudinally extending slot therethrough and a relatively thin band saw blade operatively fitting within said slot for splitting longitudinally a tubular article mounted on said mandrel.

Signed by us, this 12th day of Dec. 1928.

HERBERT F. SACKNUS.
EDWARD P. KERRUISH.